(12) United States Patent
Simonin et al.

(10) Patent No.: US 11,524,682 B2
(45) Date of Patent: Dec. 13, 2022

(54) ADAPTIVE CRUISE CONTROL FOR MOTOR VEHICLE

(71) Applicants: RENAULT s.a.s., Boulogne-Billancourt (FR); NISSAN MOTOR CO., LTD., Yokohama (JP)

(72) Inventors: Antoine Simonin, Antony (FR); Rodolphe Debeauvais, Versailles (FR)

(73) Assignees: RENAULT s.a.s, Boulogne-Billancourt (FR); NISSAN MOTOR CO., LTD., Yokohama (JP)

( * ) Notice: Subject to any disclaimer, the term of this patent is extended or adjusted under 35 U.S.C. 154(b) by 63 days.

(21) Appl. No.: 17/055,844

(22) PCT Filed: May 6, 2019

(86) PCT No.: PCT/EP2019/061508
§ 371 (c)(1),
(2) Date: Nov. 16, 2020

(87) PCT Pub. No.: WO2019/219425
PCT Pub. Date: Nov. 21, 2019

(65) Prior Publication Data
US 2021/0253100 A1    Aug. 19, 2021

(30) Foreign Application Priority Data

May 18, 2018   (FR) .................................... 18 54166

(51) Int. Cl.
*B60W 30/17*   (2020.01)
*B60W 30/14*   (2006.01)
(Continued)

(52) U.S. Cl.
CPC .......... *B60W 30/17* (2013.01); *B60W 30/143* (2013.01); *B60W 30/165* (2013.01);
(Continued)

(58) Field of Classification Search
CPC .. B60W 30/17; B60W 30/143; B60W 30/165; B60W 40/02; B60W 50/00;
(Continued)

(56) References Cited

U.S. PATENT DOCUMENTS

2013/0191003 A1* 7/2013 Hah ................ B60W 30/18027
701/99
2017/0197549 A1* 7/2017 Vladimerou .......... B60W 30/08
(Continued)

FOREIGN PATENT DOCUMENTS

DE   10 2005 022 676 A1   11/2006
DE   10 2014 201 544 A1    7/2015
(Continued)

OTHER PUBLICATIONS

International Search Report dated Jul. 17, 2019 in PCT/EP2019/061508 filed on May 6, 2019, 2 pages.

*Primary Examiner* — Nicholas Kiswanto
*Assistant Examiner* — Mohamad O El Sayah
(74) *Attorney, Agent, or Firm* — Oblon, McClelland, Maier & Neustadt, L.L.P.

(57) ABSTRACT

An adaptive cruise control for a motor vehicle includes a detection module for detecting a vehicle ahead, a production module capable of producing a setpoint, a storage module configured to store a value corresponding to the setpoint, a chronometer configured to be initialized and activated at a moment when the vehicle stops, and a reinitialization module for reinitializing the storage module. This cruise control includes a setup module capable of determining a limit according to the environment of the vehicle. The reinitialization module reinitializes the value stored by the storage module if the chronometer provides a duration greater than the limit.

10 Claims, 3 Drawing Sheets

(51) Int. Cl.
*B60W 30/165* (2020.01)
*B60W 40/02* (2006.01)
*B60W 50/00* (2006.01)
*G06V 20/58* (2022.01)

(52) U.S. Cl.
CPC ............ *B60W 40/02* (2013.01); *B60W 50/00* (2013.01); *G06V 20/582* (2022.01); *G06V 20/584* (2022.01); *B60W 2050/0088* (2013.01); *B60W 2554/80* (2020.02); *B60W 2555/60* (2020.02)

(58) Field of Classification Search
CPC ......... B60W 2555/60; B60W 2554/80; B60W 2050/0088; G06V 20/584; G06V 20/582
See application file for complete search history.

(56) References Cited

U.S. PATENT DOCUMENTS

2017/0359561 A1* 12/2017 Vallespi-Gonzalez ....................... H04N 13/239
2017/0361841 A1* 12/2017 Kojo ..................... B60W 30/16
2018/0312164 A1* 11/2018 Sasabuchi ....... B60W 30/18018

FOREIGN PATENT DOCUMENTS

| EP | 1 195 283 A1 | 4/2002 |
| FR | 2 770 016 A1 | 4/1999 |
| FR | 2 977 851 A1 | 1/2013 |

* cited by examiner

ADAPTIVE CRUISE CONTROL FOR MOTOR VEHICLE

The present invention relates to the field of adaptive cruise control for motor vehicle, and more particularly of adaptive speed control or of adaptive distance control.

BACKGROUND

Devices for aiding motor vehicle driving comprise adaptive cruise controllers also known by the term "Adaptive Cruise Control Stop And Go systems" or by the corresponding acronym "ACCS&G". An adaptive cruise controller incorporated in a follower vehicle makes it possible to control the cruising of the follower vehicle by taking account of a lead vehicle situated in front of the follower vehicle. The expression "control the cruising" is understood to mean to control the speed of the follower vehicle or the distance between the follower vehicle and the lead vehicle. When the lead vehicle stops, the adaptive cruise controller detects this stopping and orders the stopping of the follower vehicle. When the lead vehicle restarts, the adaptive cruise controller stops ordering the stopping of the follower vehicle.

In a conventional manner, an adaptive command controller is capable of storing a control setpoint before the instant of stopping of the follower vehicle. When the lead vehicle restarts, control resumes with the stored setpoint. For example, the adaptive cruise controller keeps in memory a setpoint for activation of a speed control of the follower vehicle at a setpoint speed. When the lead vehicle restarts, the speed control is automatically activated at the setpoint speed.

Such a design does not afford full satisfaction however. Indeed, when the lead vehicle stops at a traffic light, at a stop signal or at a roundabout, the resumption of control with the stored setpoint can generate dangerous situations, such as the absence of the marking of stopping at the traffic light, at the stop signal, or else the breaching of a priority rule.

To alleviate these drawbacks, it has been proposed to reinitialize the stored setpoint if the stopping of the lead vehicle exceeds a limit of the order of a few seconds.

Although such a solution makes it possible to limit the danger occasioned by storing the setpoint, it constrains the driver to reactivate the control in situations not exhibiting any particular danger, for example in stop-start traffic on a highway.

In view of the foregoing, the aim of the invention is to allow adaptive cruise control alleviating the aforementioned drawbacks.

BRIEF SUMMARY

More particularly, the aim of the invention is to limit the dangers related to the storage of the setpoint of an adaptive cruise control while avoiding compelling the driver to reactivate the control in situations in which there is little or no danger.

To this effect, there is proposed an adaptive cruise controller for motor vehicle comprising a detection module for detecting a lead vehicle, a formulation module able to formulate a setpoint, a storage module configured to store a value corresponding to the setpoint, a chronometer configured to be initialized and actuated at an instant of stopping of the vehicle and a reinitialization module for reinitializing the storage module.

According to one of its general characteristics, this controller comprises an establishment module able to determine a limit as a function of an environment of the vehicle, the reinitialization module being configured to reinitialize the value stored by the storage module if the chronometer delivers a duration greater than the limit.

The establishment module makes it possible to establish the value of the limit as a function of the environment in which the vehicle is traveling. Thus, the swiftness with which the stored setpoint is reinitialized is linked with an estimation of a level of danger incurred by the vehicle.

According to one embodiment, the establishment module comprises a determination module able to determine an environment of the vehicle and a map containing values of limits as a function of an environment.

Advantageously, the formulation module is able to formulate at least one setpoint chosen from among a speed control activation setpoint, a control speed setpoint, an activation setpoint of a distance control with respect to a lead vehicle and a control distance setpoint.

Advantageously, the determination module is configured to determine an environment chosen from among an urban environment, a peri-urban environment, a rural environment, an expressway environment and a highway environment.

Preferably, the determination module comprises at least one means chosen from among an ultrasound sensor, a radar, a lidar, a camera, an inertial measurement unit, an odometer, a satellite-based worldwide positioning device.

Such means are devices which are generally already incorporated in motor vehicles. The cost of production of the adaptive cruise controller is thus limited.

In one embodiment, the determination module comprises at least one identification unit chosen from among an identification unit in respect of another vehicle, a pedestrian identification unit, a road infrastructure identification unit, a road geometry identification unit and a meteorological conditions identification unit.

Advantageously, the determination module is able to identify at least one highway or expressway symbol chosen from among a highway section commencement sign, a main network route panel and a secondary network route panel, and configured to determine that the environment is a road environment if a highway or expressway symbol is identified.

In one embodiment, the determination module is able to identify at least one urban symbol chosen from among a built-up area entry sign, a cycleway announcement sign and a pedestrian crosswalk announcement sign, and configured to determine that the environment is an urban environment if an urban symbol is identified.

In another embodiment, the determination module is able to identify at least one danger symbol chosen from among a roundabout indication sign, a stop sign and a traffic light announcement sign, and configured to determine that the environment is a dangerous environment if a danger symbol is identified.

Advantageously, the establishment module chooses a limit lying between 25 seconds and 35 seconds in the case of a road environment, a limit lying between 2 seconds and 4 seconds in the case of an urban environment and a limit of less than 0.1 second in the case of a dangerous environment.

Limits chosen in these intervals of values are particularly suitable for limiting the danger occasioned by the storage of the setpoint while avoiding implementing a reinitialization in situations in which there is little or no danger.

According to another aspect, there is proposed a method of adaptive cruise control of a motor vehicle, in which a lead vehicle is detected, a setpoint is formulated, a value corresponding to the setpoint is stored before an instant of stopping of the vehicle, an environment of the vehicle is determined and the value stored is reinitialized as a function of the environment determined.

In a mode of implementation, a chronometer is actuated from the instant of stopping, a limit is calculated as a function of an environment of the vehicle and the value stored is reinitialized when the chronometer delivers a duration greater than the limit.

BRIEF DESCRIPTION OF THE DRAWINGS

Other aims, characteristics and advantages of the invention will become apparent on reading the following description, given solely by way of nonlimiting example and with reference to the appended drawings in which.

DETAILED DESCRIPTION

Figure 1:
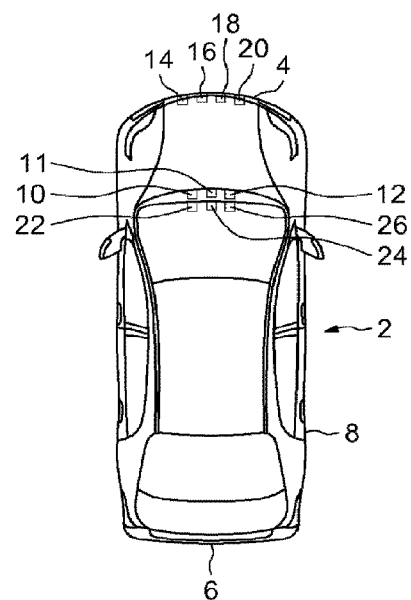
FIG. 1 is a schematic view of a motor vehicle incorporating a controller according to one aspect of the invention.

With reference to FIG. 1, a motor vehicle 2 has been schematically represented. The vehicle 2 comprises a front end 4 and a rear end 6.

In the present patent application, the words "front" and "rear" will be understood as referring to the front 4 and rear 6 ends of the vehicle 2. Likewise, the terms "longitudinal", "transverse", "left" and "right" will be understood by considering the longitudinal direction globally joining the ends 4 and 6 of the vehicle 2.

The vehicle 2 comprises a bodyshell 8, an onboard computer 10, a driver interface 11 and a satellite-based worldwide positioning system 12, also known by the term "Global Navigation Satellite System" and by the corresponding acronym "GNSS", such as for example the "Global Positioning System" known by the corresponding acronym "GPS".

The vehicle 2 furthermore comprises a radar 14, a lidar 16, an ultrasound sensor 18 and a camera 20. The components 14, 16, 18 and 20 are disposed in proximity to the front end 4 of the vehicle 2, for example in a radiator grille, a cowl vent grille, a zone in proximity to a windshield or fender of the vehicle 2. In this way, the components 14, 16, 18 and 20 acquire images representative of the environment of the vehicle 2, in particular of the environment situated in front of the vehicle 2.

The vehicle 2 comprises an odometer 22 and an inertial measurement unit 24. The odometer 22 and the inertial measurement unit 24 are in information linkage with the onboard computer 10 and are able to provide information such as a relative position or an acceleration of the vehicle 2. The odometer 22 and the onboard computer 10 are capable of determining the speed $V_{VEH}$ of the vehicle 2.

The vehicle 2 comprises an adaptive cruise controller 26. In the example illustrated, the controller 26 implements control of the speed $V_{VEH}$ and control of a distance A with respect to a lead vehicle (not represented). However, it is of course possible to envisage, without departing from the scope of the invention, an adaptive cruise controller implementing only one of these two functions. The controller 26 is represented schematically in FIG. 2.

Figure 2:
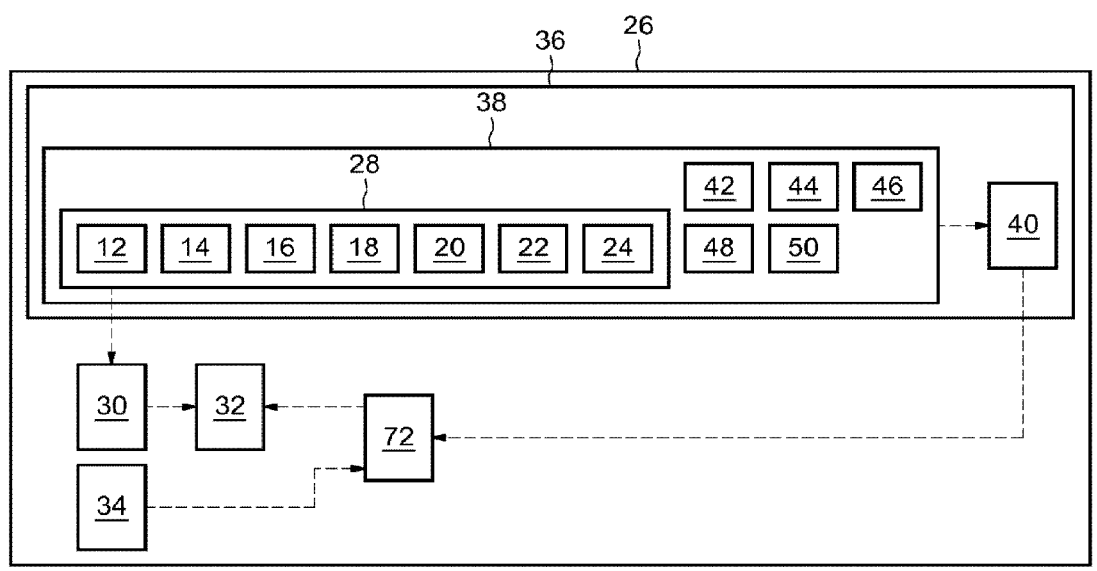
FIG. 2 is a schematic representation of the controller of the vehicle of FIG. 1.

With reference to FIG. 2, the controller 26 comprises the positioning system 12, the radar 14, the lidar 16, the ultrasound sensor 18, the camera 20, the odometer 22 and the inertial measurement unit 24. The components 12, 14, 16, 18, 20, 22 and 24 together constitute a detection module 28 intended to detect the presence and the position of a lead vehicle (not represented) relatively with respect to the vehicle 2.

The controller 26 comprises a formulation module 30. The module 30 is in information linkage with the module 28 and the onboard computer 10. The function of the module 30 is to formulate a setpoint as a function of running parameters of the vehicle 2, of an intention of the driver of the vehicle 2 and of the presence and of the position of a lead vehicle.

More particularly, the module 30 formulates a setpoint CONS_1 of activation of control of the speed $V_{VEH}$. The setpoint CONS_1 takes the value "YES" if control of the speed $V_{VEH}$ must be implemented and the value "NO" otherwise.

The module 30 generates a control speed setpoint CONS_2. The setpoint CONS_2 can take any value of speed that can be attained by the vehicle 2. More particularly, the module 30 gathers the setpoint CONS_2 from the onboard computer 10 and the input interface 11.

The module 30 formulates a setpoint CONS_3 of activation of control of the distance Δ. The setpoint CONS_3 takes the value "YES" if control of the distance A must be implemented and the value "NO" otherwise. The setpoint CONS_3 is forced to the value "NO" if the detection module 28 does not detect the presence of a lead vehicle.

The formulation module 30 generates a setpoint CONS_4 of control distance between the vehicle 2 and a lead vehicle. The setpoint CONS_4 can take any distance value which is less than the maximum range of the optical sensors 14, 16, 18 and 20. In the example illustrated, the value of the setpoint CONS_4 is calculated as a function of the speed $V_{VEH}$.

The setpoints CONS_1, CONS_2, CONS_3 and CONS_4 are addressed to a traction command device (not represented) of the vehicle 2. The traction command device drives the power train (not represented) of the vehicle 2 in such a way that the vehicle 2 moves in compliance with the setpoints CONS_1, CONS_2, CONS_3 and CONS 4. Stated otherwise, the traction command device drives the power train in such a way that:

if CONS_1="YES", the speed $V_{VEH}$ converges to CONS_2, and if CONS_3="YES", the distance A converges to CONS_4.

The module 28 and the module 30 are furnished with the hardware means and software means for detecting a significant slowing or a complete stopping of the lead vehicle. When a significant slowing or a complete stopping of the lead vehicle is detected, the module 30 emits a storage signal MEMO. Thereafter, the module 30 adapts the setpoints CONS_1, CONS_2, CONS_3 and CONS_4 to progressively stop the vehicle 2.

The controller 26 comprises a storage module 32. The module 32 is in information linkage with the module 30. More particularly, at each rising edge of the signal MEMO emitted by the module 30, the module 32 stores the values of the setpoints CONS_1, CONS_2, CONS_3 and CONS_4 emitted by the module 30.

The controller 26 comprises a chronometer 34 in information linkage with the onboard computer 10. More particularly, the chronometer 34 is configured to initialize itself to zero and to trigger as soon as the speed $V_{VEH}$ becomes zero. When it is triggered, the chronometer 34 displays the elapsed duration t since the instant of triggering.

The controller 26 comprises an establishment module 36. The establishment module 36 comprises a determination module 38 and a map 40. In the example illustrated, the module 38 comprises the detection module 28 in particular.

The determination module 38 comprises an identification unit in respect of another vehicle 42, a pedestrian identification unit 44, a road geometry identification unit 46, a road infrastructure identification unit 48 and a meteorological conditions identification unit 50. The units 42, 44, 46, 48 and 50 are in information linkage with the module 28. More particularly, the units 42, 44, 46, 48 and 50 are furnished with the hardware means and software means for processing the images captured by the components 14, 16, 18 and 20 of the module 28 and the information gathered by the components 22 and 24 of the module 28. On the basis of these images and of this information, the units 42, 44, 46, 48 and 50 identify data representative of a danger level incurred by the vehicle 2.

Figure 3:
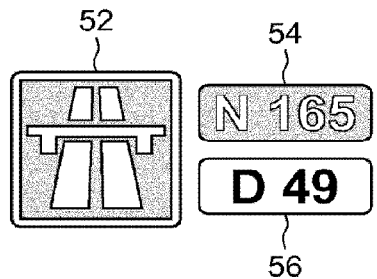
FIG. 3 illustrates examples of highway symbols and of expressway symbols.
Figure 4:
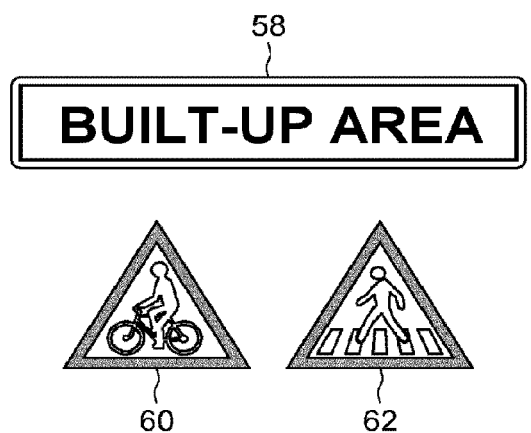
FIG. 4 illustrates examples of urban symbols.
Figure 5:
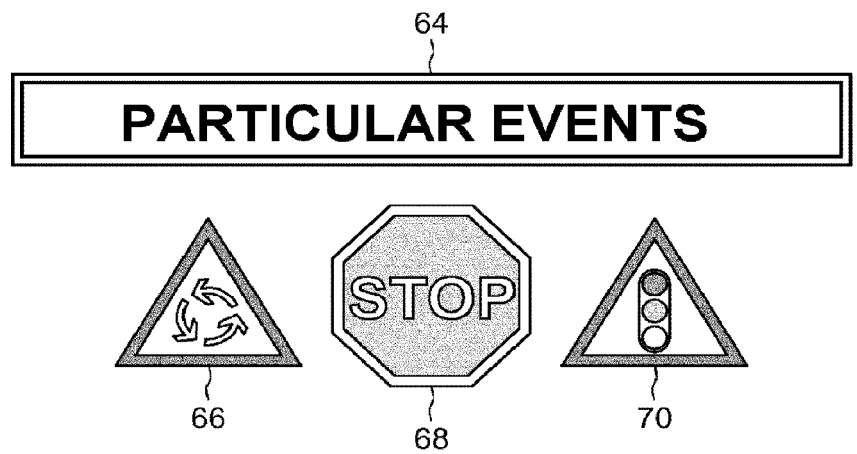
FIG. 5 illustrates examples of danger symbols.

In the example illustrated, the unit 48 is furnished with the hardware means and software means for identifying signposts characteristic of an environment of the vehicle 2. Examples of such signposts have been represented in FIGS. 3 to 5.

The unit 48 is configured to identify the highway section commencement sign 52, the national route panel 54 and the regional route panel 56. If the unit 48 identifies the sign 52, 54 or 56, the module 38 emits a signal ROAD_ENVIR. Thus, the module 38 is capable of detecting that the vehicle 2 is traveling in a road environment, that is to say on a highway, an expressway, a main road in a rural setting or a main road in a periurban setting, such as a ring road or a bypass.

The unit 48 is moreover configured to identify the built-up area entry sign 58, the cycleway announcement sign 60 and the pedestrian crosswalk announcement sign 62. If the unit 48 identifies the sign 58, 60 or 62, the module 38 emits a signal URBAN_ENVIR. Thus, the module 38 is capable of detecting that the vehicle 2 is traveling in an urban environment, that is to say in particular on a street in town.

The unit 48 is configured to identify the announcement sign for a particular event 64, the roundabout indication sign 66, the stop sign 68, also known by the term "STOP" sign, and the traffic light announcement sign 70. If the unit 48 identifies the sign 64, 66, 68 or 70, the module 38 emits a signal DANGER_ENVIR. Thus, the module 38 is capable of detecting that the vehicle 2 is traveling in a dangerous environment, that is to say in particular in proximity to a crossroad in an urban, periurban or rural setting or to a level crossing.

In the example illustrated, the unit 48 is configured to recognize the shape, the size, the color and the characters written on the signs 52, 54, 56, 58, 60, 62, 64, 66, 68 and 70. Although the unit 48 is specially configured to identify the signs represented in FIGS. 3 to 5 which correspond to the regulations of the French highway code, it is very obviously possible without departing from the scope of the invention to configure the unit 48 to identify other signs, in particular corresponding to the legislation of another country in which the vehicle 2 is intended to travel.

When none of the aforementioned signs can be identified, or when the aforementioned signs are identified with too significant an error margin, the determination module 38 is configured to take account of the data analyzed by the units 42, 44, 46 and 50.

More particularly, the unit 42 gathers the images captured by the radar 14, the lidar 16, the ultrasound sensor 18 and the camera 20 to identify the presence and the position of other vehicles in the environment of the vehicle 2. The unit 44 gathers the same images as the unit 42 to detect the presence of a pedestrian in the vicinity of the vehicle 2. If a large number of vehicles and/or of pedestrians are identified, the module 38 emits the signal URBAN_ENVIR.

The unit 46 gathers the information provided by the positioning system 12, the odometer 22 and the inertial measurement unit 24, as well as the images captured by the radar 14, the lidar 16, the ultrasound sensor 18 and the camera 20 to identify a particular road geometry. In particular, the unit 46 can detect a carriageway exhibiting the form of a roundabout, a carriageway exhibiting a slope, a carriageway exhibiting the form of an expressway access sliproad, a carriageway exhibiting the form of a crossing. According to the road geometry detected by the unit 46, the module 38 emits a different signal ROAD_ENVIR, URBAN_ENVIR or DANGER_ENVIR.

The unit 50 gathers the images captured by the radar 14, the lidar 16, the ultrasound sensor 18 and the camera 20, as well as the information emitted by the odometer 22 and the inertial measurement unit 24 to identify particular meteorological conditions. For example, if the unit 50 detects rainy or snowy weather conditions, the module 38 emits a different signal DANGER_ENVIR.

The map 40 is in information linkage with the module 38. More particularly, the map 40 gathers the signal ROAD_ENVIR, URBAN_ENVIR or DANGER_ENVIR emitted by the module 38. The map 40 delivers values of time limit LIM as a function of the signal gathered. In the example illustrated, the map 40 delivers:
  when the signal ROAD_ENVIR is entered as input, a limit LIM lying between 25 seconds and 35 seconds, preferably substantially 30 seconds,
  when the signal URBAN_ENVIR is entered as input, a limit LIM lying between 2 seconds and 4 seconds, preferably substantially 3 seconds, and
  when the signal DANGER_ENVIR is entered as input, a limit LIM of strictly less than 0.1 second, preferably substantially 0 second.

The controller 26 comprises a reinitialization module 72 in information linkage with the module 32, the chronometer 34 and the map 40. More precisely, the module 72 is able to gather the limit LIM. The module 72 is moreover able to gather the duration t displayed by the chronometer 34. The module 72 is able to emit a signal REINIT for reinitialization of the storage module 32. The module 72 is configured to emit the signal REINIT as soon as the duration t exceeds the limit LIM. When the module 32 receives the signal REINIT, the setpoints CONS_1, CONS_2, CONS_3 and CONS_4 stored are reinitialized. More specifically, when the module 32 gathers the signal REINIT, the setpoints CONS_1 and CONS_3 take the value "NO".

Figure 6:
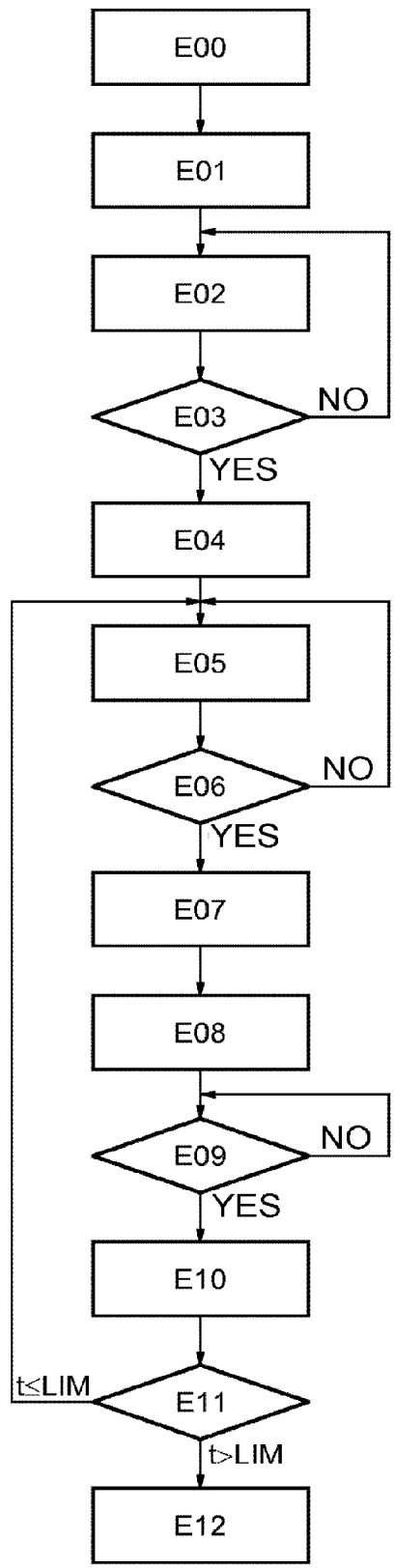
FIG. 6 illustrates a method of adaptive cruise control according to another aspect of the invention.

The method of adaptive cruise control able to be implemented by means of the controller 26 has been schematically represented with reference to FIG. 6.

The method comprises an initialization step E00. During step E00, the vehicle 2 is running at the speed $V_{VEH\_E00}$ and the controller 26 is activated by the driver.

The method comprises a step E01 of establishing the first and second setpoints. More precisely, in the course of step E01, the setpoint CONS_1 takes the value "YES". The setpoint CONS_2 takes a value equal to the speed $V_{VEH\_E00}$.

The method comprises a step E02 of implementing control of the speed $V_{VEH}$ tending to make it converge to the speed $V_{VEH\_E00}$.

The method comprises thereafter a test step E03 in the course of which it is detected whether a vehicle is present in the traffic lane of the vehicle 2 and in front of the vehicle 2. For the time that the response to step E03 is "NO", step E02 continues to be applied. If, on completion of step E03, the response is "YES", a step E04 is applied.

In the course of step E04, the values of the setpoints CONS_1, CONS_3 and CONS_4 are modified. More precisely, the setpoint CONS_1 takes the value "NO", the setpoint CONS_3 takes the value "YES" and the setpoint CONS_4 takes a value $A_{Eo4}$ proportional to the speed $V_{VEH}$.

The method comprises a step E05 in the course of which the distance A is controlled in such a way that it converges to $\Delta_{E04}$. Although, in the exemplary implementation illustrated, the switch from speed control to distance control follows upon the detection of the presence of a lead vehicle independently of an intention of the driver, it is possible without departing from the scope of the invention to provide for some other mode of driving the switch from speed control to distance control and vice versa. For example, the switch from one type of control to another can follow upon an action of the driver on the interface 11.

The method comprises a test step E06. In the course of step E06, it is detected whether a pronounced slowing or a stopping of the lead vehicle takes place. If, in the course of step E06, a pronounced slowing or a stopping of the lead vehicle is not detected, step E05 is repeated. If, on completion of step E06, a stopping or a pronounced slowing of the lead vehicle has been detected, a step E07 is applied.

In the course of step E07, the signal MEMO is emitted and the module 32 stores the setpoints CONS_1, CONS_2, CONS_3 and CONS_4.

The method comprises a step E08 of stopping the vehicle 2. In the course of step E08, the traction command device is driven in such a way as to stop the vehicle 2. When the vehicle 2 has stopped, the chronometer 34 is initialized and actuated. Step E08 is then terminated.

The method comprises a test step E09 in the course of which it is determined whether the lead vehicle restarts. As long as the response is "NO", step E09 is repeated. As soon as the response to step E09 is "YES", a step E10 is applied.

In the course of step E10, the limit LIM delivered by the map 40 corresponding to the environment in which the vehicle 2 is traveling is gathered.

The method comprises a test step E11 of comparing the limit LIM with the value t displayed by the chronometer 34. More precisely, in step 11:
if t<LIM, distance control is resumed by applying step E05, and
if t>LIM, a step E12 is applied.

In the course of step E12, the module 72 emits the signal REINIT. Consequently, the module 32 is reinitialized, that is to say that the setpoints CONS_1 and CONS_3 take the value "NO". On completion of step E12, the method is terminated.

In the exemplary implementation illustrated, the choice of a reinitialization depends directly on the comparison between the value t and the limit LIM which can take various values. However, one does not depart from the scope of the invention by envisaging other modes of driving. For example, step E12 can be directly implemented right from the emission of the signal DANGER_ENVIR by the module 38. Moreover, steps E10 and E11 can be replaced with a test step in the course of which two simultaneous tests are implemented, namely to determine whether a signal URBAN_ENVIR has been emitted and the value t exceeds 2 seconds or whether a signal ROAD_ENVIR has been emitted and the value t exceeds 30 seconds. Stated otherwise, such a step may be written:

[{URBAN_ENVIR emitted AND t≥2 seconds}
OR {ROAD_ENVIR emitted AND t≥30 seconds}]

If the response to this test step is YES, step E12 is applied. Otherwise, cruising control is resumed with the stored setpoint.

In view of the foregoing, by virtue of the controller 26 and the control method according to the invention, it is possible to implement an adaptive cruise control while limiting the risks related to the storage of the setpoint in dangerous situations, such as a crossroad with a traffic light, without however constraining the driver to reactivate the control in situations in which there is little or no danger, such as stop-start traffic on the highway.

The invention claimed is:

1. An adaptive cruise controller for a motor vehicle traveling on a road, comprising:
   a detection module configured to detect a lead vehicle;
   a formulation module configured to formulate a setpoint to control a speed of the vehicle;
   a storage module configured to store a value corresponding to the setpoint;
   a chronometer configured to be initialized and actuated at an instant of stopping of the vehicle;
   a reinitialization module configured to reinitialize the storage module; and
   an establishment module configured to determine a limit as a function of an environment of the vehicle, the establishment module including a determination module that is configured to select the environment of the vehicle from a plurality of environments based on a sign that is identified from a plurality of signs on the road, and the limit has a value that changes based on the sign that is identified,
   wherein the reinitialization module is configured to reinitialize the value stored by the storage module such that the vehicle is restarted to operate according to the setpoint when the chronometer delivers a duration greater than the limit.

2. The controller as claimed in claim 1, in which the formulation module is configured to formulate at least one setpoint chosen from among a speed control activation setpoint, a control speed setpoint, an activation setpoint of a distance control with respect to a lead vehicle, and a control distance setpoint.

3. The controller as claimed in claim 2, in which the establishment module comprises a map containing values of limits as a function of an environment.

4. The controller as claimed in claim 3, in which the determination module comprises at least one means chosen from among an ultrasound sensor, a radar, a lidar, a camera, an inertial measurement unit, an odometer, and a satellite-based worldwide positioning device.

5. The controller as claimed in claim 3, in which the determination module comprises at least one identification unit chosen from among an identification unit in respect of another vehicle, a pedestrian identification unit, a road infrastructure identification unit, a road geometry identification unit, and a meteorological conditions identification unit.

6. The controller as claimed in claim 3, in which the determination module is configured to identify at least one highway or expressway symbol chosen from among the plurality of signs on the road, and is configured to determine that the environment is a road environment when the highway or expressway symbol is identified.

7. The controller as claimed in claim 3, in which the determination module is configured to identify at least one urban symbol chosen from among a built-up area entry sign, a cycleway announcement sign, and a pedestrian crosswalk announcement sign, and is configured to determine that the environment is an urban environment when the urban symbol is identified.

8. The controller as claimed in claim 3, in which the determination module is configured to identify at least one danger symbol chosen from among a roundabout indication sign, a stop sign, and a traffic light announcement sign, and is configured to determine that the environment is a dangerous environment when the danger symbol is identified.

9. The controller as claimed in claim 1, in which the establishment module chooses a limit lying between 25 seconds and 35 seconds in the case of a road environment, a limit lying between 2 seconds and 4 seconds in the case of an urban environment, and a limit of less than 0.1 second in the case of a dangerous environment.

10. A method of adaptive cruise control of a motor vehicle traveling on a road, comprising:
    detecting a lead vehicle;
    formulating a setpoint to control a speed of the vehicle;
    storing a value corresponding to the setpoint before an instant of stopping of the vehicle;
    determining an environment of the vehicle, the determining including selecting the environment of the vehicle from a plurality of environments based on a sign that is identified from a plurality of signs on the road;
    determining a limit as a function of the environment that is determined for the vehicle, the limit having a value that changes based on the sign that is identified; and
    reinitializing the value stored such that the vehicle is restarted to operate according to the setpoint when a time duration that the vehicle is stopped is greater than the limit.

* * * * *